United States Patent
Rao et al.

(10) Patent No.: US 11,165,625 B2
(45) Date of Patent: Nov. 2, 2021

(54) NETWORK STATE MANAGEMENT

(71) Applicant: Juniper Networks, Inc., Sunnyvale, CA (US)

(72) Inventors: Amit Kumar Rao, Ontario (CA); Erin C. MacNeil, Ottawa (CA); Sairam Neelam, Hyderabad (IN)

(73) Assignee: Juniper Networks, Inc., Sunnyvale, CA (US)

( * ) Notice: Subject to any disclaimer, the term of this patent is extended or adjusted under 35 U.S.C. 154(b) by 109 days.

(21) Appl. No.: 16/115,026

(22) Filed: Aug. 28, 2018

(65) Prior Publication Data
US 2020/0021479 A1 Jan. 16, 2020

(30) Foreign Application Priority Data
Jun. 28, 2018 (IN) .............................. 201841024081

(51) Int. Cl.
*G06F 15/173* (2006.01)
*H04L 12/24* (2006.01)
*H04L 29/08* (2006.01)

(52) U.S. Cl.
CPC .......... *H04L 41/0206* (2013.01); *H04L 67/32* (2013.01)

(58) Field of Classification Search
CPC ............................ H04L 41/0206; H04L 67/32
USPC ......................................................... 709/224
See application file for complete search history.

(56) References Cited

U.S. PATENT DOCUMENTS

| | | | |
|---|---|---|---|
| 2002/0071436 A1* | 6/2002 | Border | H04L 47/193 370/395.32 |
| 2003/0182431 A1 | 9/2003 | Sturniolo et al. | |
| 2009/0274045 A1* | 11/2009 | Meier | H04L 12/5602 370/235 |
| 2013/0055287 A1 | 2/2013 | Pope et al. | |
| 2015/0172153 A1 | 6/2015 | Sharma et al. | |
| 2016/0191521 A1 | 1/2016 | Feroz et al. | |
| 2017/0099228 A1* | 4/2017 | Hunsperger | G06F 9/545 |
| 2018/0007178 A1 | 1/2018 | Subhraveti | |

OTHER PUBLICATIONS

Ayuso et al., "Communicating between the kernel and user-space in Linux using Netlink sockets", https://pdfs.semanticscholar.org/6efd/e161a2582ba5846e4b8fea5a53bc305a64f3.pdf, 2010, 17 pages.
Rosen, "Linux Kernel Networking", http://www.haifux.org/lectures/172/netLec.pdf, 2007, 88 pages.

* cited by examiner

*Primary Examiner* — Suraj M Joshi
*Assistant Examiner* — Joel Mesa
(74) *Attorney, Agent, or Firm* — Harrity & Harrity, LLP (57) ABSTRACT

A network device intercepts, from an application associated with a user space, a request message associated with obtaining information regarding a network state from a kernel. The network device directs the request message to a service daemon of the user space based on intercepting the request message, and determines, using the service daemon, network state information regarding the network state. The network device intercepts, from the service daemon, a response message associated with providing the network state information to the application, and directs an altered response message to the application based on intercepting the response message such that the altered response message identifies the kernel as a source of the response message and not the service daemon as the source of the response message.

20 Claims, 7 Drawing Sheets

NETWORK STATE MANAGEMENT

RELATED APPLICATION(S)

This application claims priority under 35 U.S.C. § 119 to Indian Patent Application No. 201841024081, filed on Jun. 28, 2018, the content of which is incorporated by reference herein in its entirety.

BACKGROUND

In a packet routing system, netlink sockets may be used to transfer information between a kernel process and a user-space process of a network device. For example, an application of the network device may query a kernel state, add an object, and/or the like, using a netlink socket. In some system architectures, a network state may be maintained in a user space. Alternatively, the network state may be distributed such that multiple nodes of the system architecture (e.g., multiple network devices) store information relating to the network state.

SUMMARY

According to some possible implementations, a network device may include one or more memories, and one or more processors, communicatively coupled to the one or more memories, to detect, from an application of the network device associated with a user space of the network device, a request message associated with obtaining information regarding a network state from a kernel of the network device, wherein the request message is addressed to the kernel of the network device, and wherein the network state is not maintained in the kernel of the network device. The one or more processors may readdress the request message to a service daemon of the network device, wherein the service daemon is associated with the user space of the network device, and may direct the request message to the service daemon based on readdressing the request message. The one or more processors may obtain, using the service daemon, network state information regarding the network state based on directing the request message to the service daemon. The one or more processors may detect, from the service daemon, a response message associated with providing the network state information, wherein a sender identification indicator of the response message identifies the service daemon as a sender of the response message. The one or more processors may alter the response message to cause the sender identification indicator to identify the kernel of the network device as the sender of the response message, and may direct the response message to the application of the network device based on altering the response message.

According to some possible implementations, a non-transitory computer-readable medium may store instructions that include one or more instructions that, when executed by one or more processors, cause the one or more processors to intercept, from an application associated with a user space, a request message associated with obtaining information regarding a network state from a kernel, and may direct the request message to a service daemon of the user space based on intercepting the request message. The one or more instructions may cause the one or more processors to determine, using the service daemon, network state information regarding the network state, and may intercept, from the service daemon, a response message associated with providing the network state information to the application. The one or more instructions may cause the one or more processors to direct an altered response message to the application based on intercepting the response message such that the altered response message identifies the kernel as a source of the response message and not the service daemon as the source of the response message.

According to some possible implementations, a method may include detecting, by a network device, a request message associated with accessing information regarding a network state from a kernel. The method may include accessing, by the network device, network state information regarding the network state in a user space based on detecting the request message. The method may include providing, by the network device, a response message associated with the network state information based on accessing the network state information.

DETAILED DESCRIPTION

The following detailed description of example implementations refers to the accompanying drawings. The same reference numbers in different drawings may identify the same or similar elements.

In a network device, a socket may be used to transfer information between a kernel and a user space process, such as an application operating on the network device. For example, an application of the network device may query a kernel for a network state, add objects to the kernel, and/or the like using a netlink socket. Additionally, or alternatively, the application of the network device may modify the network state, in the kernel, using a netlink socket. However, in some cases, a network state may be maintained in a user space and/or may be distributed such that multiple network devices (e.g., nodes of a network) maintain at least a portion of the network state. In this case, when the network state is maintained in the user-space and/or distributed to multiple network devices, the application of the network device may generate a request for information relating to the network state from the kernel, and the request may fail as a result of the kernel not storing the information relating to the network state, which may prevent the application from operating on the network device, thereby reducing usability of the network device, negatively impacting utilization of a network that includes the network device, and/or the like. Moreover, customizing each application for deployment on the network device may require excessive computing resources for application modification, application testing, and/or the like.

Some implementations, described herein, may provide for network state management. For example, the network device may monitor for and detect a request directed to a kernel of the network device and relating to information associated with a network state, may intercept the request, and may modify the request to enable the request to be successfully fulfilled using a user space service daemon of the network device. Moreover, the network device may monitor for and detect a response to the request, intercept the response, and modify the response to cause a kernel of the network device to be indicated as a source for the network state information rather than a user space service daemon of the network device. In this way, the network device enables utilization of applications that require that information relating to the network state be obtained and/or modified, thereby improving functionality of the network device, improving functionality of a network that includes the network device, reducing a processing utilization relating to processing failed requests, and/or the like. Moreover, the network device enables implementation of applications requiring access to the network state without application customization, thereby reducing processing utilization, memory utilization, and/or the like associated with generating multiple versions of custom applications, storing multiple versions of custom applications, and/or the like.

Figure 1:
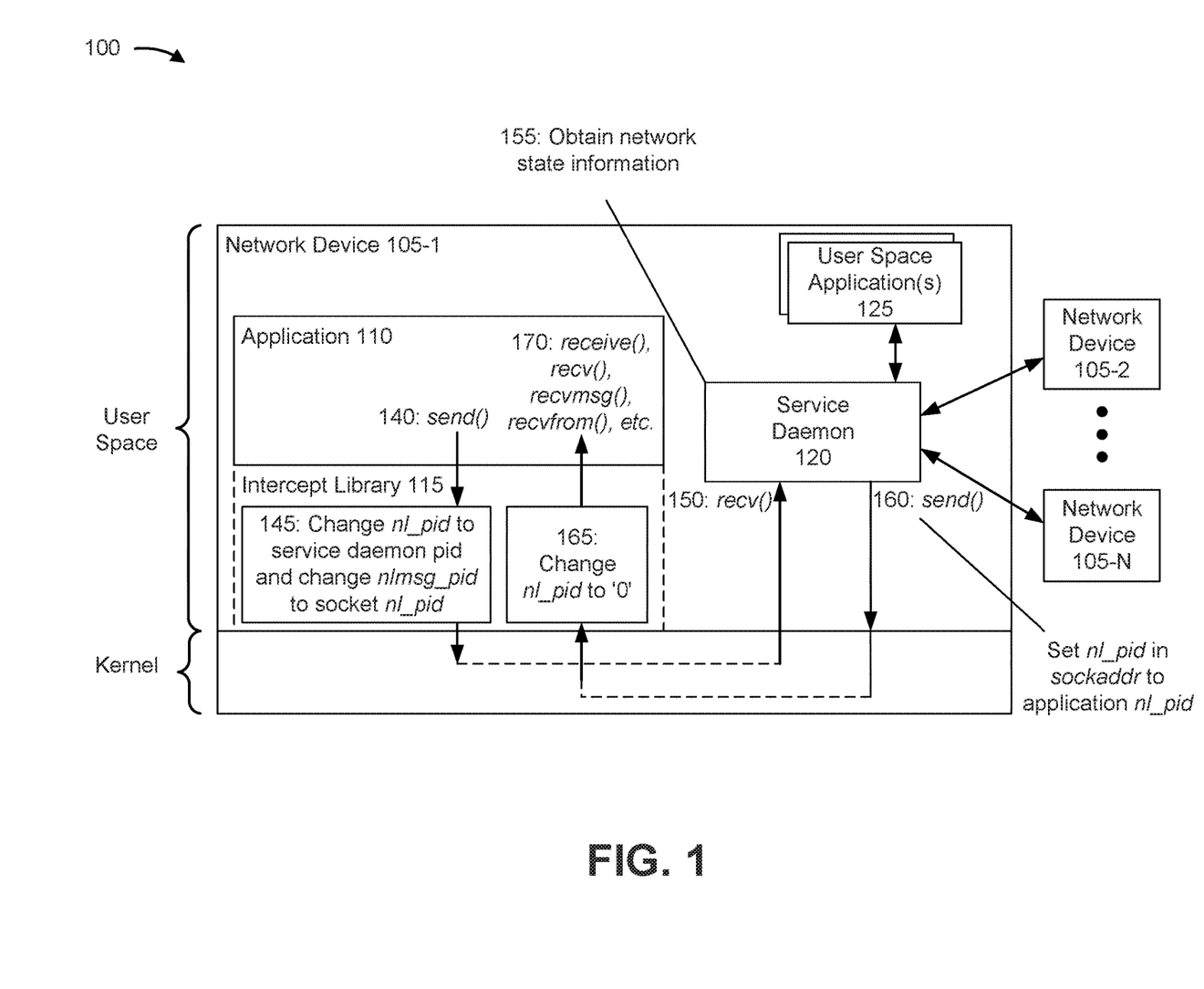
FIG. 1 is a diagram of an example implementation described herein.

FIG. 1 is a diagram of an example implementation 100 described herein. As shown in FIG. 1, example implementation 100 may include a set of network devices 105-1 through 105-N (N≥2). As further shown in FIG. 1, network device 105-1 may include an application 110, an intercept library 115, a service daemon 120, and one or more user space applications 125.

As further shown in FIG. 1, and by reference number 140, an application 110 of network device 105-1 may send a request for network state information from a user space of network device 105-1 using a send command (send( )) of application 110. For example, application 110 of network device 105-1, which may be operating in a user space of network device 105-1, may generate a netlink socket system call to request network state information identifying a network state from a kernel of application 110. Additionally, or alternatively, application 110 of network device 105-1 may generate the netlink socket system call to request access to a network state to set the network state to a particular value (e.g., a particular state). In some implementations, application 110 of network device 105-1 may set a particular destination address for the request. For example, application 110 of network device 105-1 may set a netlink socket identifier (e.g., nl_pid) in a destination socket address of the request to a socket address in the kernel of network device 105-1 to attempt to access the network state, which application 110 of network device 105-1 is configured to know to be stored in the kernel.

As further shown in FIG. 1, and by reference number 145, to facilitate network state management, network device 105-1 may implement intercept library 115, which may include a function to intercept the request, and alter the request. For example, network device 105-1 may use intercept library 115 to detect the request and readdress the request. In some implementations, network device 105-1 may use intercept library 115 to alter a netlink socket identifier. For example, network device 105-1 may use intercept library 115 to readdress the request to a destination socket address associated with service daemon 120 network device 105-1. In this way, network device 105-1 causes a kernel of network device 105-1 to not process the send command, and directs the send command to service daemon 120, thereby avoiding the request failing when the network state is not stored in the kernel. In some implementations, network device 105-1 may use intercept library 115 to alter a source identifier of the request. For example, network device 105-1 may set a netlink message source socket identifier (nlmsg_pid), which identifies a netlink socket of network device 105-1, to a netlink socket identifier of application 110 of network device 105-1. In this way, network device 105-1 enables service daemon 120 of network device 105-1 to determine a source of the send command (e.g., application 110 of network device 105-1) and address a response message to the source of the send command.

As further shown in FIG. 1, and by reference number 150, service daemon 120 of network device 105-1 may receive the request. For example, based on network device 105-1 using intercept library 115 to intercept and readdress the request, network device 105-1 may direct the request to service daemon 120. As shown by reference number 155, network device 105-1 uses service daemon 120 to obtain the network state information relating to the network state. For example, network device 105-1 may use service daemon 120 to obtain network state information stored in the user space from one or more user space applications 125 of network device 105-1. In this case, the one or more user space applications 125 of network device 105-1 may be applications associated with storing, managing, altering, and/or the like the network state. For example, the one or more user space applications 125 of network device 105-1 may include a fibd function (e.g., a user space application that manages a forwarding information base for packet forwarding), an ifmand function (e.g., a user space application that manages an interface for packet forwarding), and/or the like. In this way, network device 105-1 enables network state information determination and/or modification where the network state is maintained in the user space of network device 105-1.

In some implementations, in a distributed system architecture where each network device 105 stores only a portion of the network state information, network device 105-1 may use service daemon 120 to obtain the network state information from other network devices 105 (e.g., network devices 105-2 through 105-N). For example, network device 105-1 may cause service daemon 120 to request network state information from one or more other network devices 105, and may receive response messages identifying portions of the network state from the one or more other network devices 105. In this way, network device 105-1 enables network state information determination and/or modification in a distributed system architecture.

As further shown in FIG. 1, and by reference number 160, as a response to receiving the request, service daemon 120 of network device 105-1 may generate a response message, and may send the response message. In some implementations, service daemon 120 of network device 105-1 may set a destination address (e.g., a netlink socket identifier (an nl_pid)) of the response message to a destination socket address of application 110 of network device 105-1. As shown by reference number 165, network device 105-1 may use intercept library 115 to intercept the response message, and to alter the response message. For example, network device 105-1 may use intercept library 115 to change the netlink socket identifier to '0'. In this way, network device 105-1 causes application 110 of network device 105-1 to determine that the response message was directed from the kernel of network device 105-1 (rather than from service daemon 120 of network device 105-1), thereby causing application 110 of network device 105-1 to determine that the response message is a response to the request and includes network state information. As shown by reference number 170, application 110 of network device 105-1 may receive the altered response message that includes network state information (e.g., using a receive command (receive( ), recv( ), recvmsg( ), recvfrom( ), and/or the like).

In this way, network device 105-1 enables applications of network device 105-1 to obtain network state information when the network state information is not stored in the kernel of network device 105-1, thereby improving functioning of network device 105-1, a network that includes network device 105-1, and/or the like. Moreover, based on enabling applications, configured for network state information stored in a kernel, to operate on network device 105-1 without customization as to where network state information is actually stored (e.g., the user space or in a distributed architecture), network device 105-1 reduces a utilization of processing resources to customize applications, a utilization of memory resources to store multiple customized versions of an application, and/or the like.

As indicated above, FIG. 1 is provided merely as an example. Other examples are possible and may differ from what was described with regard to FIG. 1.

Figure 2:
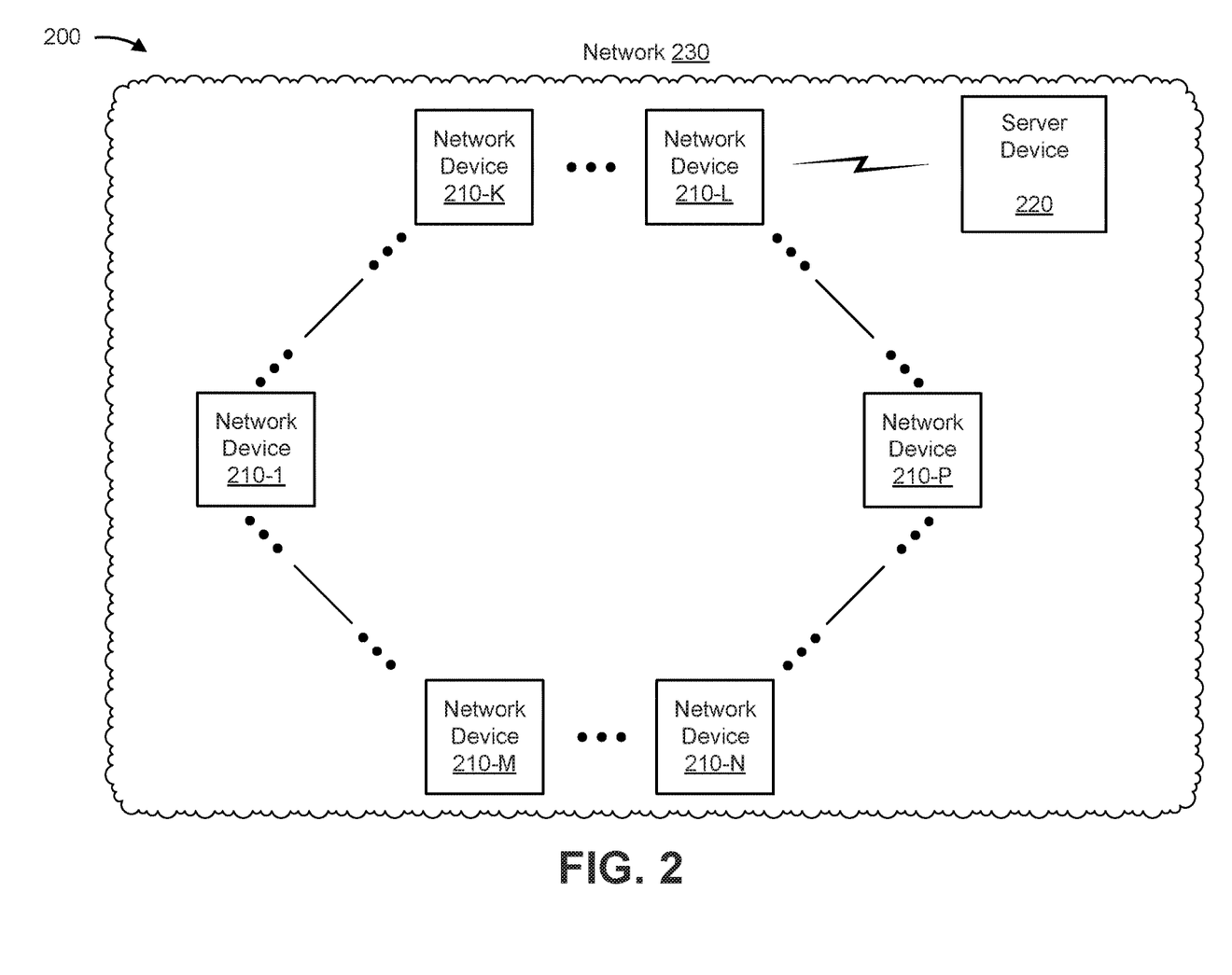
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-P (P≥1) (hereinafter referred to collectively as "network devices 210," and individually as "network device 210"), a server device 220, and a network 230. Devices of environment 200 may interconnect via wired connections, wireless connections, or a combination of wired and wireless connections.

Network device 210 includes one or more devices (e.g., one or more traffic transfer devices) capable of processing and/or transferring traffic between endpoint devices. For example, network device 210 may include a firewall, a router, a gateway, a switch device, a hub, a bridge, a reverse proxy, a server (e.g., a proxy server), a top of rack (ToR) switch, a load balancer, a switch interface board, a controller, a switching element, a packet processing component, or a similar device. In some implementations, network device 210 may include a user space and a kernel. In some implementations, network device 210 may store network state information in the user space. In some implementations, network device 210 may not store network state information in a kernel (e.g., a Linux kernel). In some implementations, network devices 210 may form a distributed architecture, such that a first network device 210 stores a first portion of network state information and a second network device 210 stores a second portion of network state information. In some implementations, network device 210 may be a physical device implemented within a housing, such as a chassis. In some implementations, network device 210 may be a virtual device implemented by one or more computer devices of a cloud computing environment or a data center.

Server device 220 includes one or more devices capable of storing, processing, and/or routing information associated with routing network traffic. For example, server device 220 may include a server that includes computing resources that may be utilized in connection with traffic routing. In some implementations, server device 220 may include a communication interface that allows server device 220 to receive information from and/or transmit information to other devices in environment 200.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a communications network, a telecommunications network, a private network, an ad hoc network, an intranet, the Internet, a fiber optic-based network, a cloud computing network, or the like, and/or a combination of these or other types of networks.

In some implementations, network device 210 and/or server device 220 may be a virtual device implemented by one or more computing devices of a cloud computing environment or a data center.

The number and arrangement of devices shown in FIG. 2 are provided as an example. In practice, there may be additional devices, fewer devices, different devices and/or networks, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
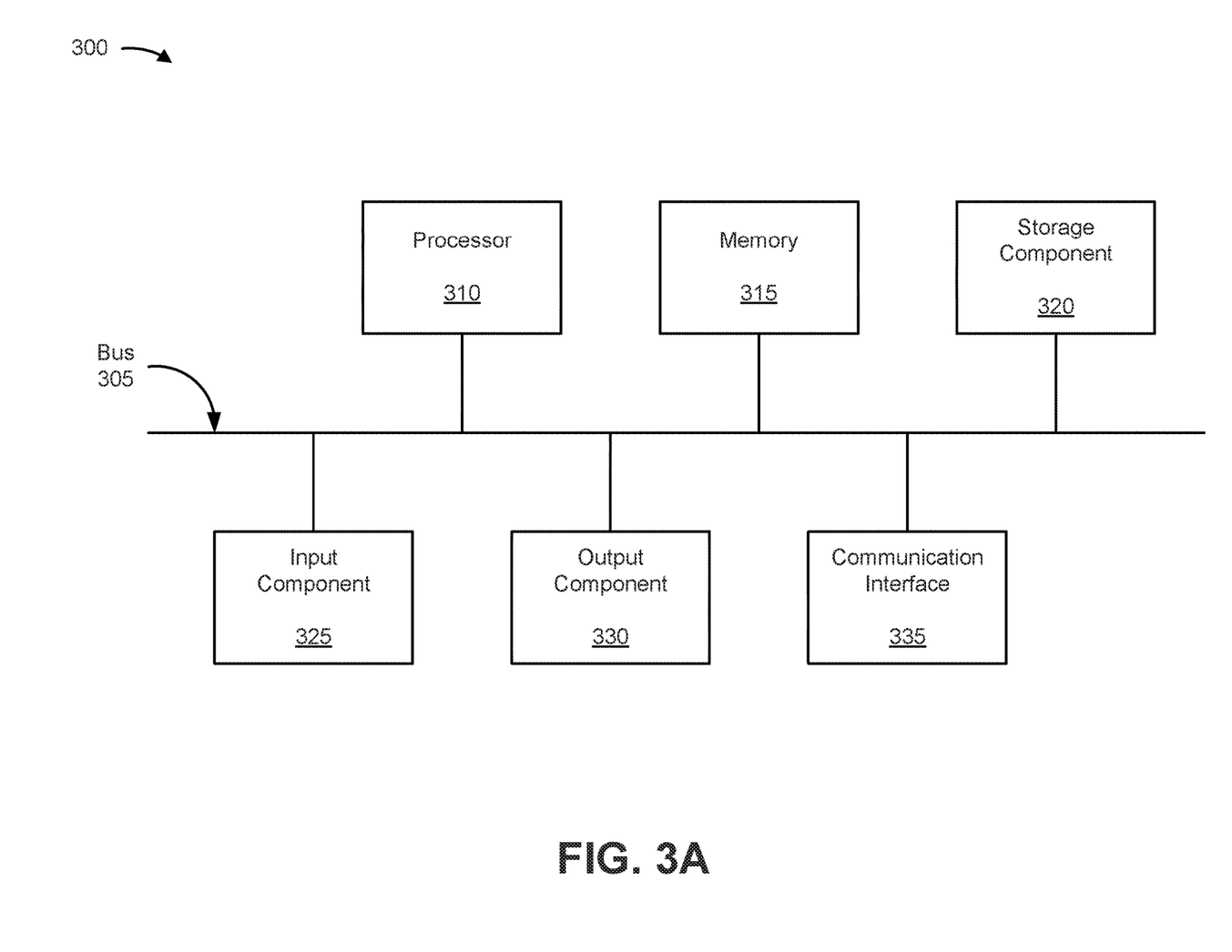
FIGS. 3A and 3B are diagrams of example components of one or more devices of FIG. 2.
Figure 3B:
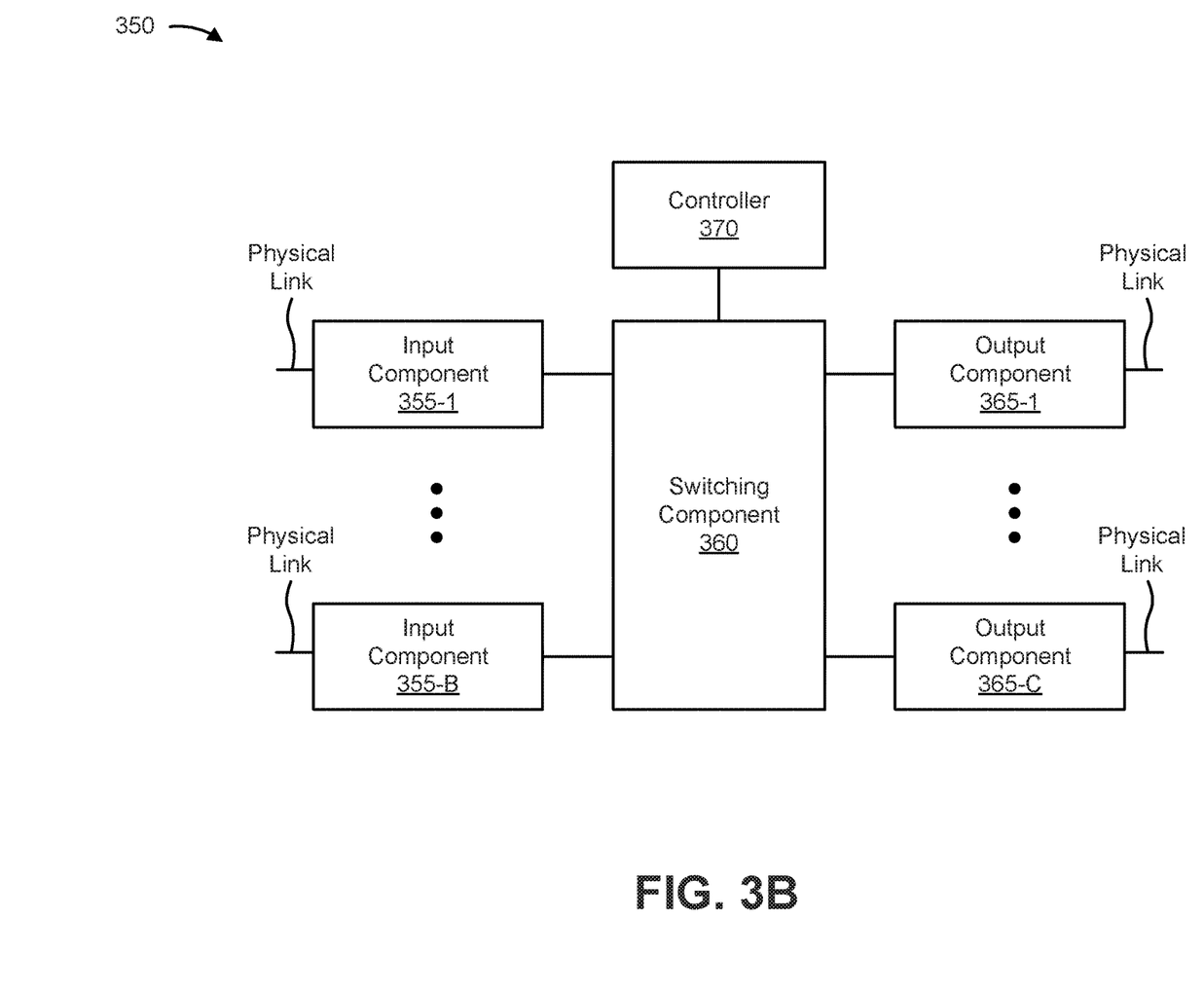

FIGS. 3A-3B are diagrams of example components of one or more devices of FIG. 2. FIG. 3A is a diagram of example components of a device 300. Device 300 may correspond to network device 210 and/or server device 220. In some implementations, network device 210 and/or server device 220 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS)

component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to network device 210. In some implementations, network device 210 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
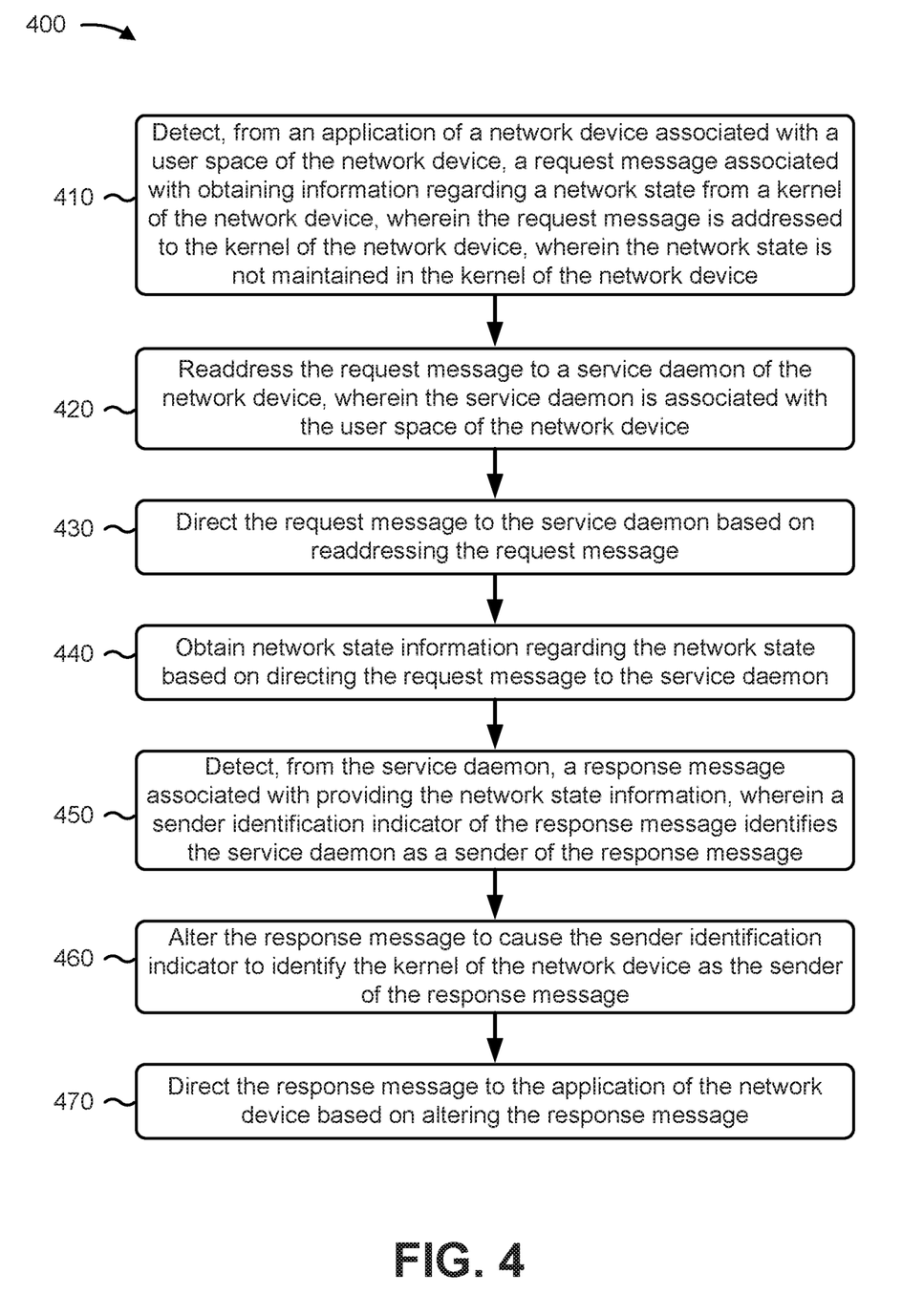
FIG. 4 is a flow chart of an example process for network state management.

FIG. 4 is a flow chart of an example process 400 for network state management. In some implementations, one or more process blocks of FIG. 4 may be performed by a network device (e.g. network device 210). In some implementations, one or more process blocks of FIG. 4 may be performed by another device or a group of devices separate from or including the network device (e.g. network device 210), such as a server device (e.g. server device 220).

As shown in FIG. 4, process 400 may include detecting, from an application of the network device associated with a user space of the network device, a request message associated with obtaining information regarding a network state from a kernel of the network device, wherein the request message is addressed to the kernel of the network device, wherein the network state is not maintained in the kernel of the network device (block 410). For example, the network device (e.g., using processor 310, memory 315, storage component 320, controller 370, and/or the like) may detect, from an application of the network device associated with a user space of the network device, a request message associated with obtaining information regarding a network state from a kernel of the network device, as described above in connection with FIG. 1. In some implementations, the request message may be addressed to the kernel of the network device, and the network state may not be maintained in the kernel of the network device.

As further shown in FIG. 4, process 400 may include readdressing the request message to a service daemon of the network device, wherein the service daemon is associated with the user space of the network device (block 420). For example, the network device (e.g., using processor 310, memory 315, storage component 320, controller 370, and/or the like) may readdress the request message to a service daemon of the network device, as described above in connection with FIG. 1. In some implementations, the service daemon may be associated with the user space of the network device.

As further shown in FIG. 4, process 400 may include directing the request message to the service daemon based on readdressing the request message (block 430). For example, the network device (e.g., using processor 310, memory 315, storage component 320, controller 370, and/or the like) may direct the request message to the service daemon based on readdressing the request message, as described above in connection with FIG. 1.

As further shown in FIG. 4, process 400 may include obtaining, using the server daemon, network state information regarding the network state based on directing the request message to the service daemon (block 440). For example, the network device (e.g., using processor 310, memory 315, storage component 320, input component 325, output component 330, communication interface 335, input component 355, output component 365, controller 370, and/or the like) may obtain, using the service daemon, network state information regarding the network state based on directing the request message to the service daemon, as described above in connection with FIG. 1.

As further shown in FIG. 4, process 400 may include detecting, from the service daemon, a response message associated with providing the network state information, wherein a sender identification indicator of the response message identifies the service daemon as a sender of the response message (block 450). For example, the network device (e.g., using processor 310, memory 315, storage component 320, controller 370, and/or the like) may detect, from the service daemon, a response message associated with providing the network state information, as described above in connection with FIG. 1. In some implementations, a sender identification indicator of the response message may identify the service daemon as a sender of the response message.

As further shown in FIG. 4, process 400 may include altering the response message to cause the sender identification indicator to identify the kernel of the network device as the sender of the response message (block 460). For example, the network device (e.g., using processor 310, memory 315, storage component 320, controller 370, and/or the like) may alter the response message to cause the sender identification indicator to identify the kernel of the network device as the sender of the response message, as described above in connection with FIG. 1.

As further shown in FIG. 4, process 400 may include directing the response message to the application of the network device based on altering the response message (block 470). For example, the network device (e.g., using processor 310, memory 315, storage component 320, controller 370, and/or the like) may direct the response message to the application of the network device based on altering the response message, as described above in connection with FIG. 1.

Process 400 may include additional implementations, such as any single implementation or any combination of implementations described below and/or in connection with one or more other processes described elsewhere herein.

In some implementations, the network state may be maintained in the user space, and, when obtaining the network state information, the network device may obtain the network state information from the user space. In some implementations, the network state may be maintained by a plurality of other devices in a distributed network architecture, and, when obtaining the network state information, the network device may communicate with the plurality of other devices to obtain the network state information.

In some implementations, the request message may be a netlink socket system call. In some implementations, the network device may implement an intercept library of functions to detect the request message, intercept the request message, and readdress the request message. In some implementations, the network device may implement an intercept library of functions to detect the response message, intercept the response message, and alter the response message.

In some implementations, when readdressing the request message, the network device may set a destination socket address to a netlink socket identifier of a netlink socket of the service daemon, and, when directing the request message to the service daemon, the network device may direct the request message to the service daemon using the netlink socket identifier of the netlink socket of the service daemon.

In some implementations, when readdressing the request message, the network device may set a sending socket address to a netlink message source socket identifier of a netlink socket of the application, and, when directing the response message to the application, the network device may direct the response message to the application using the netlink message source socket identifier of the netlink socket of the application In some implementations, the network device may be configured to provide the network state information to the application of the network device without the application of the network device being provided information indicating that the network state information was not stored in the kernel of the network device and was not provided by the kernel of the network device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
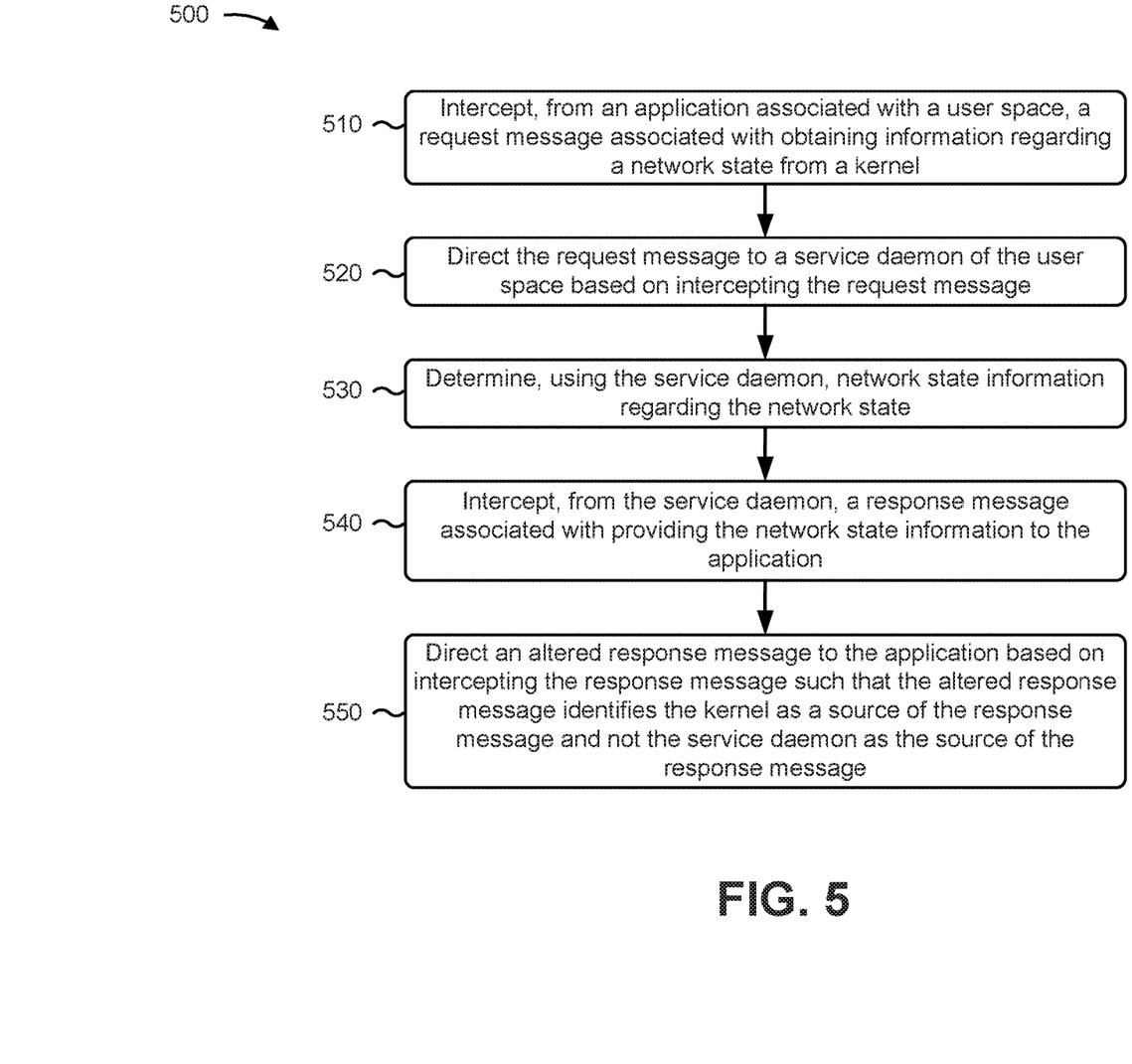
FIG. 5 is a flow chart of an example process for network state management.

FIG. 5 is a flow chart of an example process 500 for network state management. In some implementations, one or more process blocks of FIG. 5 may be performed by a network device (e.g. network device 210). In some implementations, one or more process blocks of FIG. 5 may be performed by another device or a group of devices separate from or including the network device (e.g. network device 210), such as a server device (e.g. server device 220).

As shown in FIG. 5, process 500 may include intercepting, from an application associated with a user space, a request message associated with obtaining information regarding a network state from a kernel (block 510). For example, the network device (e.g., using processor 310, memory 315, storage component 320, controller 370, and/or the like) may intercept, from an application associated with a user space, a request message associated with obtaining information regarding a network state from a kernel, as described above in connection with FIG. 1.

As further shown in FIG. 5, process 500 may include directing the request message to a service daemon of the user space based on intercepting the request message (block 520). For example, the network device (e.g., using processor 310, memory 315, storage component 320, controller 370, and/or the like) may direct the request message to a service daemon of the user space based on intercepting the request message, as described above in connection with FIG. 1.

As further shown in FIG. 5, process 500 may include determining, using the service daemon, network state information regarding the network state (block 530). For example, the network device (e.g., using processor 310, memory 315, storage component 320, input component 325, output component 330, communication interface 335, input component 355, output component 365, controller 370, and/or the like) may determine, using the service daemon, network state information regarding the network state, as described above in connection with FIG. 1.

As further shown in FIG. 5, process 500 may include intercepting, from the service daemon, a response message associated with providing the network state information to the application (block 540). For example, the network device (e.g., using processor 310, memory 315, storage component 320, controller 370, and/or the like) may intercept, from the service daemon, a response message associated with providing the network state information to the application, as described above in connection with FIG. 1.

As further shown in FIG. 5, process 500 may include directing an altered response message to the application based on intercepting the response message such that the altered response message identifies the kernel as a source of the response message and not the service daemon as the source of the response message (block 550). For example, the network device (e.g., using processor 310, memory 315, storage component 320, controller 370, and/or the like) may direct an altered response message to the application based on intercepting the response message such that the altered response message identifies the kernel as a source of the response message and not the service daemon as the source of the response message, as described above in connection with FIG. 1

Process 500 may include additional implementations, such as any single implementation or any combination of implementations described below and/or in connection with one or more other processes described elsewhere herein.

In some implementations, when determining the network state information, the network device may obtain the network state information from a user space application associated with packet forwarding routes. In some implementations, when determining the network state information, the network device may obtain the network state information from a user space application associated with managing a network interface. In some implementations, the network device may perform one or more application tasks using the network state information based on directing the altered response message to the application.

In some implementations, the request message may be associated with querying for the network state, and the response message may be associated with providing information identifying the network state. In some implementations, the request message may be associated with writing the network state to a particular value, and the response message may be associated with providing information indicating that the network state is written to the particular value. In some implementations, when determining the network state, the network device may write the network state to the particular value using the service daemon.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
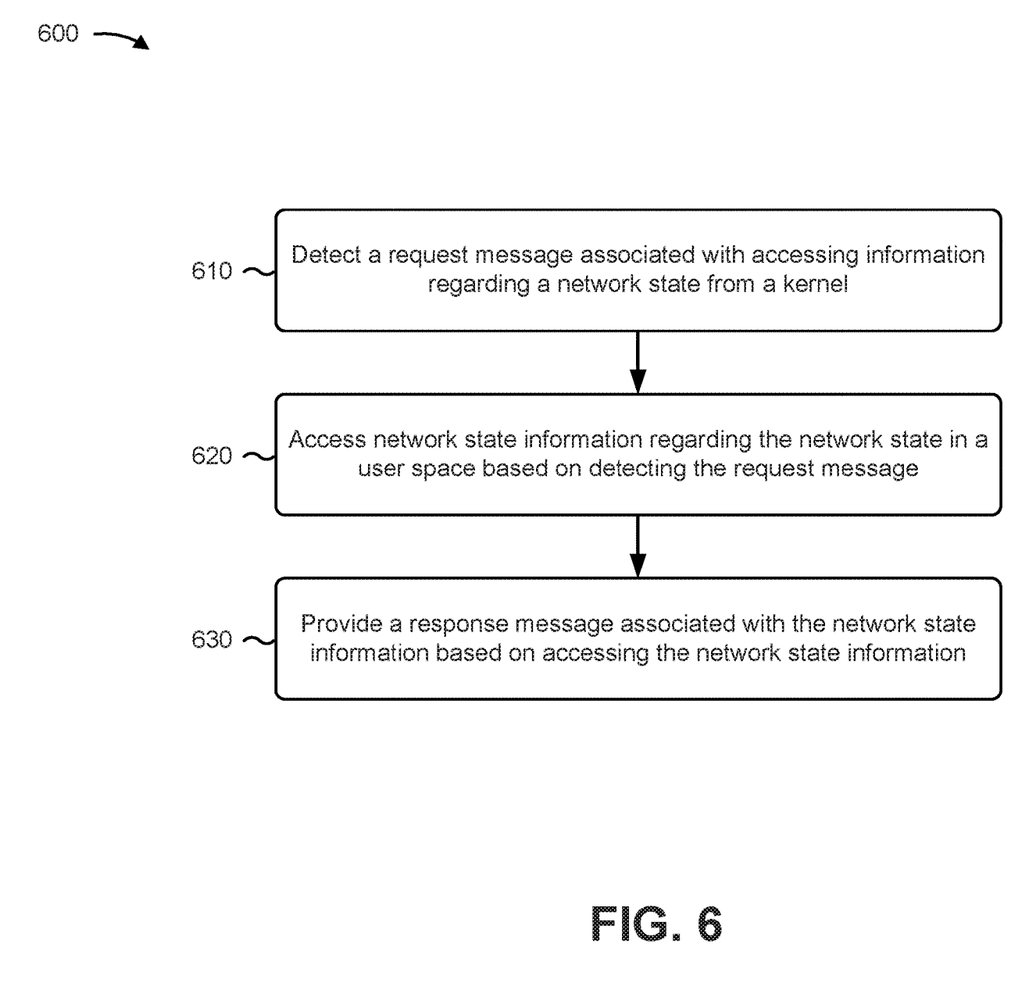
FIG. 6 is a flow chart of an example process for network state management.

FIG. 6 is a flow chart of an example process 600 for network state management. In some implementations, one or more process blocks of FIG. 6 may be performed by a network device (e.g. network device 210). In some implementations, one or more process blocks of FIG. 6 may be performed by another device or a group of devices separate from or including the network device (e.g. network device 210), such as a server device (e.g. server device 220).

As shown in FIG. 6, process 600 may include detecting a request message associated with accessing information regarding a network state from a kernel (block 610). For example, the network device (e.g., using processor 310, memory 315, storage component 320, controller 370, and/or the like) may detect a request message associated with accessing information regarding a network state from a kernel, as described above in connection with FIG. 1.

As further shown in FIG. 6, process 600 may include accessing network state information regarding the network state in a user space based on detecting the request message (block 620). For example, the network device (e.g., using processor 310, memory 315, storage component 320, input component 325, output component 330, communication interface 335, input component 355, output component 365, controller 370, and/or the like) may access network state information regarding the network state in a user space based on detecting the request message, as described above in connection with FIG. 1.

As further shown in FIG. 6, process 600 may include providing a response message associated with the network state information based on accessing the network state information (block 630). For example, the network device (e.g., using processor 310, memory 315, storage component 320, controller 370, and/or the like) may provide a response message associated with the network state information based on accessing the network state information, as described above in connection with FIG. 1.

Process 600 may include additional implementations, such as any single implementation or any combination of implementations described below and/or in connection with one or more other processes described elsewhere herein.

In some implementations, when detecting the request message, the network device may detect an application programming interface call. In some implementations, when accessing the network state information, the network device may alter the network state. In some implementations, when accessing the network state information, the network device may access the network state information in the user space and not in the kernel.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
one or more memories; and
one or more processors to:
  detect, from an application of the network device associated with a user space of the network device, a request message associated with obtaining information regarding a network state that identifies a network state from a kernel of the network device,
    wherein the request message is addressed to the kernel of the network device,
    wherein the request message includes a netlink socket identifier in a destination socket address of the request message, and
    wherein the network state is not maintained in the kernel of the network device;
  readdress, based on detecting that the request message is associated with obtaining information regarding the network state from the kernel of the network device, the request message to be addressed to a service daemon of the network device using an intercept library of functions to alter the netlink socket identifier,
    wherein the service daemon is associated with the user space of the network device; and
    wherein the netlink socket identifier is readdressed from a socket address in the kernel to a socket address associated with the service daemon;
  direct the request message to the service daemon based on readdressing the request message;
  obtain, using the service daemon, network state information regarding the network state based on directing the request message to the service daemon;
  detect, from the service daemon, a response message associated with providing the network state information,
    wherein a sender identification indicator of the response message identifies the service daemon as a sender of the response message;
  alter the response message to cause the sender identification indicator to identify the kernel of the network device as the sender of the response message; and
  direct the response message to the application of the network device based on altering the response message.

2. The network device of claim 1, wherein the network state is maintained in the user space; and wherein the one or more processors, when obtaining the network state information, are to:
obtain the network state information from the user space.

3. The network device of claim 1, wherein the network state is maintained by a plurality of other devices in a distributed network architecture; and
wherein the one or more processors, when obtaining the network state information, are to:
communicate with the plurality of other devices to obtain the network state information.

4. The network device of claim 1, wherein the request message is a netlink socket system call.

5. The network device of claim 1, wherein the one or more processors are further to:
implement the intercept library of functions to detect the request message and intercept the request message.

6. The network device of claim 1, wherein the one or more processors are further to:
implement the intercept library of functions to detect the response message, intercept the response message, and alter the response message.

7. The network device of claim 1, wherein the one or more processors, when readdressing the request message, are to:
set a destination socket address to a netlink socket identifier of a netlink socket of the service daemon; and
wherein the one or more processors, when directing the request message to the service daemon, are to:
direct the request message to the service daemon using the netlink socket identifier of the netlink socket of the service daemon.

8. The network device of claim 1, wherein the one or more processors, when readdressing the request message, are to:
set a sending socket address to a netlink message source socket identifier of a netlink socket of the application; and
wherein the one or more processors, when directing the response message to the application, are to:
direct the response message to the application using the netlink message source socket identifier of the netlink socket of the application.

9. The network device of claim 1, wherein the network device is configured to provide the network state information to the application of the network device without the application of the network device being provided information indicating that the network state information was not stored in the kernel of the network device and was not provided by the kernel of the network device.

10. A non-transitory computer-readable medium storing instructions, the instructions comprising:
one or more instructions that, when executed by one or more processors, cause the one or more processors to:
intercept, from an application associated with a user space, a request message associated with obtaining information regarding a network state that identifies a network state from a kernel,
wherein the request message includes a netlink socket identifier in a destination socket address of the request message;
direct the request message to a service daemon of the user space based on intercepting the request message using an intercept library of functions to alter the netlink socket identifier,
wherein the request message is altered from being addressed to the kernel to being addressed to the service daemon, and
wherein the netlink socket identifier is readdressed from a socket address in the kernel to a socket address associated with the service daemon;
determine, using the service daemon, network state information regarding the network state;
intercept, from the service daemon, a response message associated with providing the network state information to the application; and
direct an altered response message to the application based on intercepting the response message such that the altered response message identifies the kernel as a source of the response message and not the service daemon as the source of the response message.

11. The non-transitory computer-readable medium of claim 10, wherein the one or more instructions, that cause the one or more processors to determine the network state information, cause the one or more processors to:
obtain the network state information from a user space application associated with packet forwarding routes.

12. The non-transitory computer-readable medium of claim 10, wherein the one or more instructions, that cause the one or more processors to determine the network state information, cause the one or more processors to:
obtain the network state information from a user space application associated with managing a network interface.

13. The non-transitory computer-readable medium of claim 10, wherein the one or more instructions, when executed by the one or more processors, further cause the one or more processors to:
perform one or more application tasks using the network state information based on directing the altered response message to the application.

14. The non-transitory computer-readable medium of claim 10, wherein the request message is associated with querying for the network state; and
wherein the response message is associated with providing information identifying the network state.

15. The non-transitory computer-readable medium of claim 10, wherein the request message is associated with writing the network state to a particular value; and
wherein the response message is associated with providing information indicating that the network state is written to the particular value.

16. The non-transitory computer-readable medium of claim 15, wherein the one or more instructions, that cause the one or more processors to determine the network state, cause the one or more processors to:
write the network state to the particular value using the service daemon.

17. A method, comprising:
detecting, by a network device, a request message associated with accessing information regarding a network state that identifies a network state from a kernel,
wherein the request message includes a netlink socket identifier in a destination socket address of the request message;
readdressing, by the network device, the request message from being directed to the kernel to being addressed to a service daemon of the network device using an intercept library of functions to alter the netlink socket identifier,
wherein the netlink socket identifier is readdressed from a socket address in the kernel to a socket address associated with the service daemon;

accessing, by the network device, network state information regarding the network state in a user space based on detecting the request message; and providing, by the network device, a response message associated with the network state information based on accessing the network state information.

18. The method of claim 17, wherein detecting the request message comprises:

detecting an application programming interface call.

19. The method of claim 17, wherein accessing the network state information comprises:

altering the network state.

20. The method of claim 17, wherein accessing the network state information comprises:

accessing the network state information in the user space and not in the kernel.

* * * * *